H. H. HILBORN & C. E. ROEHL.
REINFORCING MEMBER FOR HOLLOW STRUCTURES AND STRUCTURE SO REINFORCED.
APPLICATION FILED FEB. 3, 1909.

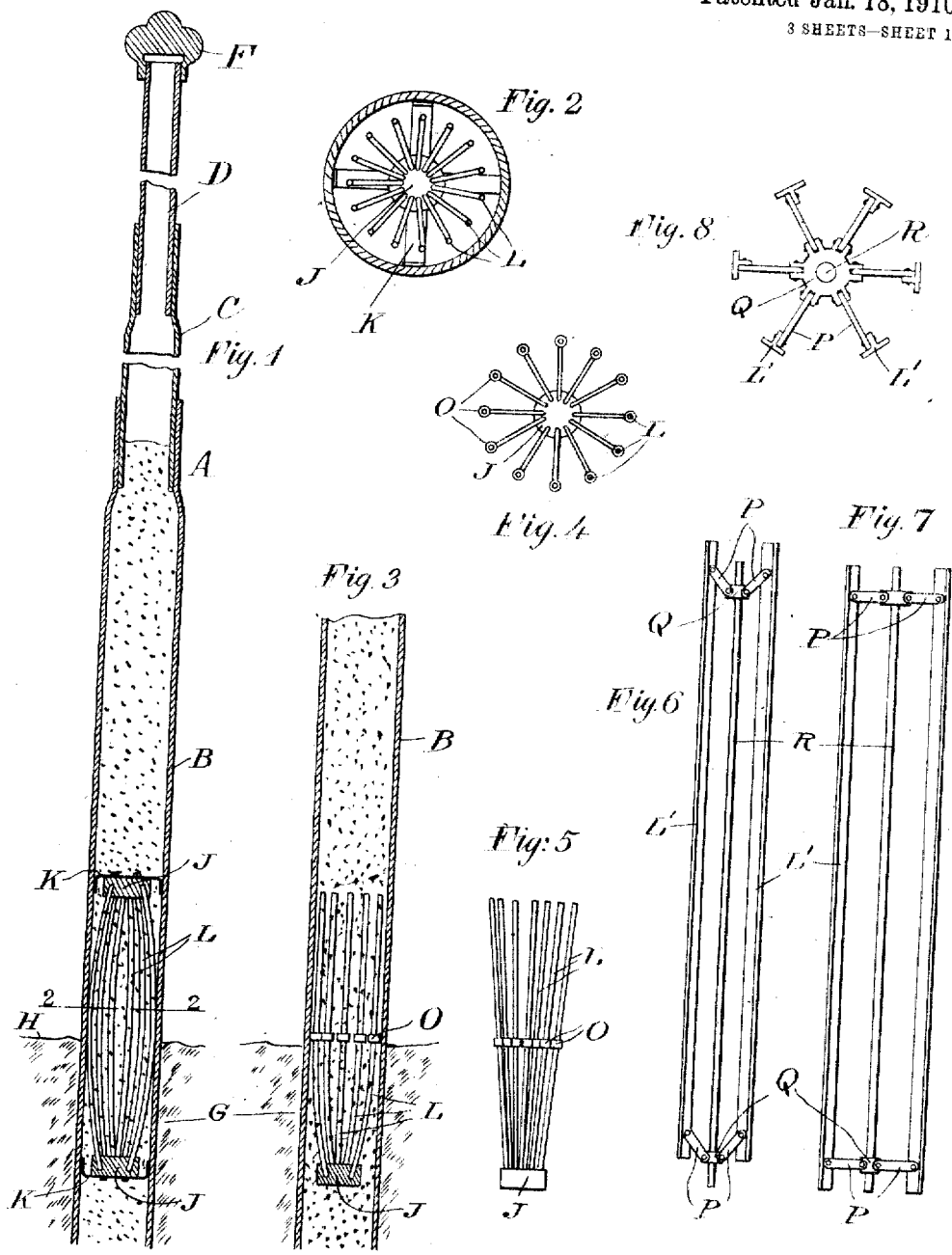

947,178.

Patented Jan. 18, 1910.
3 SHEETS—SHEET 2.

H. H. HILBORN & C. E. ROEHL.
REINFORCING MEMBER FOR HOLLOW STRUCTURES AND STRUCTURE SO REINFORCED.
APPLICATION FILED FEB. 3, 1909.

947,178.

Patented Jan. 18, 1910.

3 SHEETS—SHEET 3.

Witnesses

Inventors
Herbert H. Hilborn
Charles E. Roehl
By their Attorneys

UNITED STATES PATENT OFFICE.

HERBERT H. HILBORN AND CHARLES E. ROEHL, OF BROOKLYN, NEW YORK.

REINFORCING MEMBER FOR HOLLOW STRUCTURES AND STRUCTURE SO REINFORCED.

947,178.  Specification of Letters Patent.  Patented Jan. 18, 1910.

Application filed February 3, 1909. Serial No. 475,881.

*To all whom it may concern:*

Be it known that we, HERBERT H. HILBORN and CHARLES E. ROEHL, citizens of the Dominion of Canada and the United States, respectively, and residents of the borough of Brooklyn, county of Kings, city and State of New York, have invented certain new and useful Improvements in Reinforcing Members for Hollow Structures and Structure so Reinforced, of which the following is a specification accompanied by drawings.

This invention relates to reinforcing members for hollow structures, such as trolley poles and the like, and it also relates to the structure so reinforced.

The objects of the invention are to provide an improved reinforcing means adapted to be inserted into a hollow metallic trolley pole or like structure for reinforcing the structure at a point of weakness, as for instance, at the ground line or at a joint between the sections of the pole.

Another object of the invention is to simplify and cheapen the method of reinforcing old poles as set forth in our Patent No. 909,299, granted Jan. 12, 1909.

To these ends the invention consists of the reinforcing members and the structures so reinforced, substantially as hereinafter fully described and claimed in this specification and shown in the accompanying drawings, in which—

Figure 9:
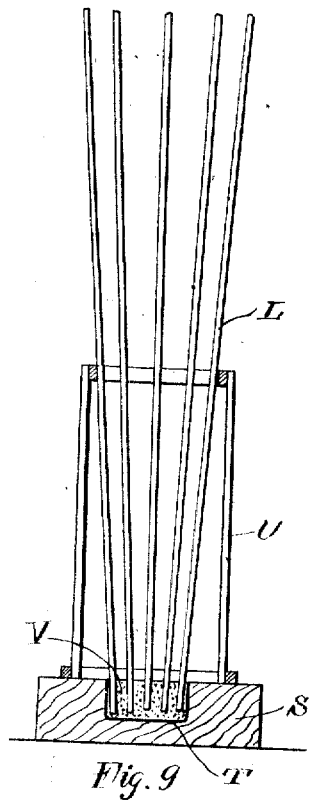
Figure 10:
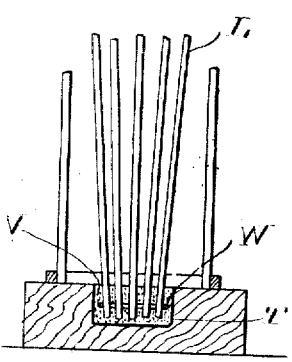
Figure 24:
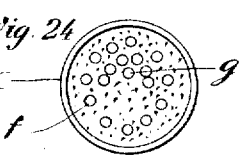
Figure 25:
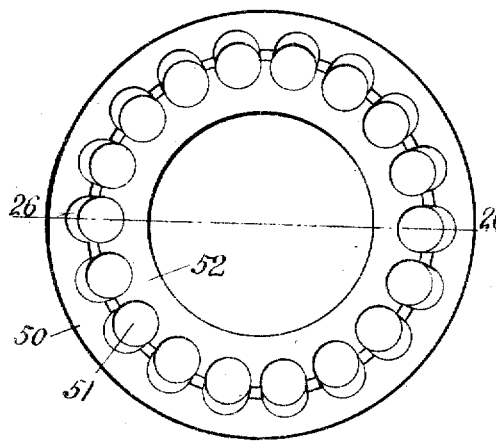
Figure 28:
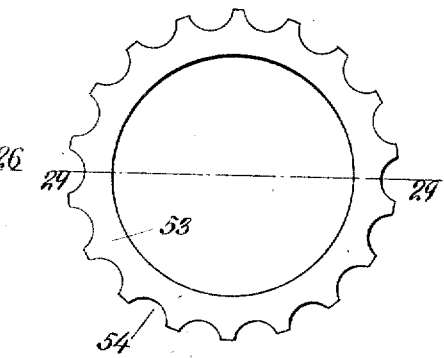
Figure 26:
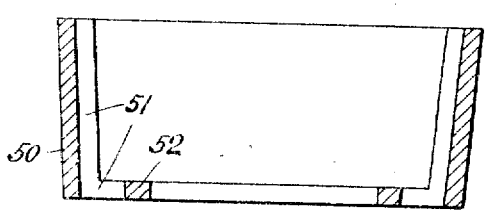
Figure 29:
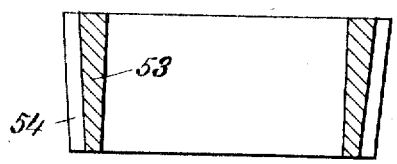
Figure 27:
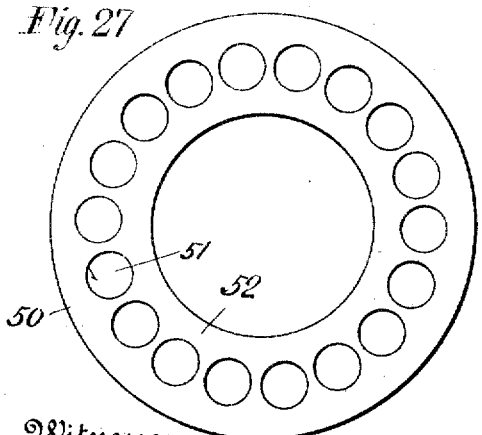
Figure 30:
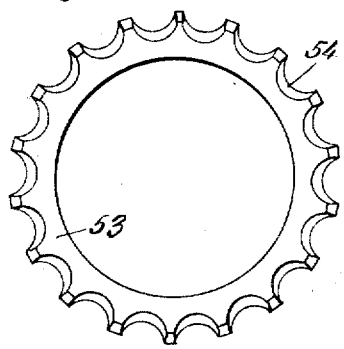

Figure 1 is a vertical sectional view partly broken away of a trolley pole reinforced in accordance with this invention; Fig. 2 is a horizontal sectional view on an enlarged scale on the line 2—2 of Fig. 1; Fig. 3 is a vertical sectional view partly broken away of a pole reinforced by a modified form of reinforcing member; Fig. 4 is a top plan view on an enlarged scale of the structure shown in Fig. 5; Fig. 5 is an elevation of the reinforcing member shown in Fig. 3 before insertion in the pole; Fig. 6 is an elevation of a modified form of reinforcing member in collapsed position; Fig. 7 is an elevation of the member shown in Fig. 6 in expanded position; Fig. 8 is a top plan view of Fig. 7 on an enlarged scale; Fig. 9 is an elevation partly in section showing the method of constructing the reinforcing member illustrated in Fig. 5; Fig. 10 is an elevation partly broken away and partly in section, showing the method of constructing a modification of Fig. 9; Figs. 11 to 24 inclusive are top plan views of sections of a pole with different forms of reinforcing members shown therein; Fig. 25 is a top plan view of a modification showing in an enlarged detail the preferred form of bottom casting for the cage or reinforcing members; Fig. 26 is a vertical sectional view on the line 26—26 of Fig. 25; Fig. 27 is a bottom plan view of the casting; Fig. 28 is a top plan view of the inner member for the casting; Fig. 29 is a vertical sectional view on the line 29—29 of Fig. 28; and Fig. 30 is a bottom plan view of the interior member.

It has been shown by experience that a trolley pole becomes so weakened at the ground line in the course of time, that it is apt to break at this point. The corrosion is due to water and secretions of various kinds collecting at the ground line and because of the effects of electrolysis. The corrosion will sometimes extend entirely through the shell of the pole, and unless cheap and efficient means are provided for reinforcing the pole, it is necessary to replace the old poles with new ones. Metallic trolley poles are ordinarily made in sections of which the bottom section is the largest in diameter and the top section is the smallest, and in accordance with this invention the old poles are reinforced from the inside instead of the outside. We insert our reinforcing member through the section of smallest diameter at the top of the pole and thrust the member down into the desired position in one of the larger members, either at the ground line or at one of the joints or other point of weakness. In one form of the invention, our reinforcing members are constructed so that they may be collapsed or contracted to enable them to pass the smallest diameter of the pole and expand into the desired position in one of the larger portions of the pole. In another form of the invention a plurality of rods or bars of any desired structural shape may be inserted into a pole of uniform diameter and suitably spaced inside the pole to reinforce the pole at the point of greatest weakness. In both forms of the invention the reinforcing member or members are embedded in concrete or other cementitious material within the pole.

Referring to the drawings, and more particularly to Fig. 1, A represents a metallic trolley pole comprising the sections B, C and D, and the cap F. The section of largest diameter is at the bottom and is set in the ground G of which H represents the ground line. The reinforcing member comprises the heads J of metal, concrete or other suitable material, to which are secured the spacing caps K, preferably of spring metal. Secured at each end in the heads H are the metallic rods or bars L of sufficient elasticity to be compressed within the smallest diameter of the pole in the upper section D. The cap F of the pole is removed and the reinforcing member described is thrust down through the pole into the position indicated in Fig. 1, extending above and below the ground line to reinforce the pole at the point at which it has become corroded and weakened. Preferably concrete or other cementitious material is first poured into the pole to fill the bottom of the pole to the desired height, upon which the reinforcing member is to rest. After the member is in position more concrete or cementitious material is poured into the pole embedding the reinforcing member in said material.

In Figs. 3, 4 and 5, a modified form of reinforcing member is shown in which there is but one head J into which the rods L are set, the opposite ends of the rods being free. Spacing blocks or washers O are secured on the rods L, preferably at a point along their length, as for instance, midway of their length, in which case the reinforcing member takes the position indicated in Fig. 3 inside of the pole. The rods L are spaced away from the walls of the pole to permit the concrete or other cementitious material to entirely surround and embed the reinforcing member. As many reinforcing members may be used as desired within the pole to reinforce several different points of weakness at the same time.

In Figs. 6, 7 and 8 another modification of the reinforcing member is shown in which the side bars L' are pivoted to the radial links P, which in turn are pivoted to the blocks Q secured on the central rod R. Preferably the side bars L' are in the form of T bars and the outer ends of the links P are adapted to abut against the bases of the bar L', as shown in Fig. 7 when the member is expanded, thus maintaining the side bars in their outermost position. This reinforcing member is inserted through the smaller end of the pole in collapsed position and allowed to expand by the weight of the side bars into the larger portion of the pole and then embedded in concrete. The connections of the side bars L' to the central rod R in effect form toggle acting joints.

Fig. 9 shows the method of constructing the reinforcing member shown in Fig. 5. In Fig. 9, S is a block or form having the recess therein and T is a metallic cap placed in said recess. U is a framework for supporting the rods L. The lower ends of these rods are spaced in the form of a circle in the cap T and cementitious material V is poured around the ends of the rods. As soon as the material V has set the structure is ready for use.

In Fig. 10 a modification of this method is shown in which the metallic band W is embedded in the material V around the ends of the rods L for strengthening purposes.

Figure 11:
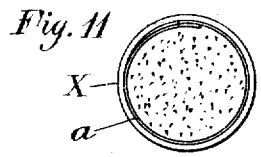
Figure 12:
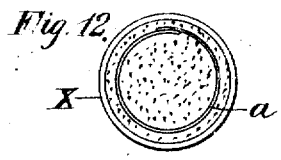
Figure 13:
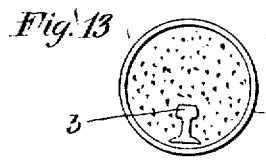
Figure 14:
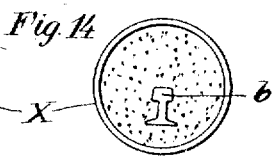
Figure 15:
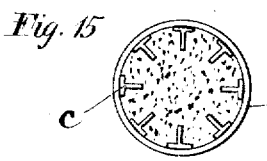
Figure 16:
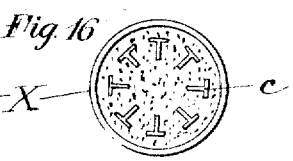
Figure 17:
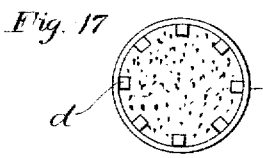
Figure 18:
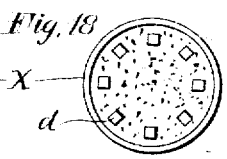
Figure 19:
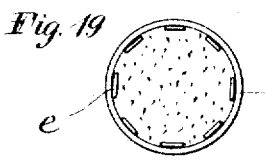
Figure 20:
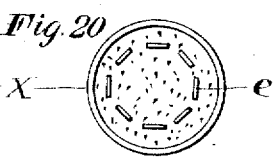
Figure 21:
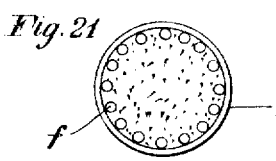
Figure 22:
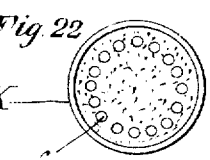
Figure 23:
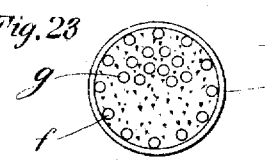

In Figs. 11 to 24 X indicates in each figure the pole to be reinforced, which is cylindrical in this case instead of being smaller at one end than at the other. These figures are arranged in pairs, showing different forms of structural shapes arranged within the pole or other hollow structure and in each pair of figures the reinforcing member or members are shown arranged against the walls of the pole and also spaced away from said walls. In Figs. 11 and 12 a split sleeve $a$ is shown inserted in the pole for reinforcing purposes and embedded in concrete. In Figs. 13 and 14 a T rail $b$ is shown, in Figs. 15 and 16 a series of T bars $c$, in Figs. 17 and 18 a series of rectangular bars $d$, in Figs. 19 and 20 a series of flat bars $e$, in Figs. 21 and 22 a series of round bars $f$. In Figs. 23 and 24 a series of round bars $f$ is shown spaced around the periphery of the pole and a group of bars $g$ is shown occupying the space at one side of a diameter of a pole to reinforce one-half of the pole at one side of the neutral axis.

It is to be understood that if the structure X is a trolley pole set in the ground, the structural shapes shown may be inserted in the pole and arranged so that they extend above and below the ground line for reinforcing the pole at this point.

This invention, of course, is equally applicable to the installation of new poles and similar structures, and can be used when the structures are first installed, as well as after they have been in use. The invention is also applicable to hollow structures, whether adapted to be used in an upright position or in a horizontal position.

All of the forms of reinforcing members shown in Figs. 1 to 10, inclusive, are simple in construction and cheap to manufacture and possess the attributes essential for reinforcing structures of the character described.

The preferred form of bottom casting for the cage or reinforcing members is shown in Figs. 25 to 30 inclusive. This casting preferably comprises the outer flaring cupped shaped member 50 having perforations 51 in the flange 52. The inner member 53 is shown in Figs. 28 to 30, and is an annular form having a scalloped or recessed edge 54. The member 53 is placed inside of the member 50 and the reinforcing rods are held between said members.

We claim and desire to obtain by Letters Patent the following:

1. A reinforcing member for reinforcing hollow structures, such as trolley poles and the like, comprising at least one head or block and a series of spring members secured to said block and extending outwardly therefrom.

2. A reinforcing member for reinforcing hollow structures, such as trolley poles and the like, comprising a pair of heads or blocks, and spring members having their ends secured to said blocks, thereby forming a cage.

3. A reinforcing member for reinforcing hollow structures, such as trolley poles and the like, comprising at least one head or block, a series of spring members secured to said block and extending outwardly therefrom, and spacing blocks carried by said spring members.

4. A reinforcing member for reinforcing hollow structures, such as trolley poles and the like, comprising a head or block, and spring members extending outwardly therefrom in the form of a cone.

5. A reinforced hollow structure, having a reinforcing member embedded in concrete or other cementitious material therein, said reinforcing member comprising at least one head or block, and longitudinal spring members connected thereto.

6. A reinforced hollow structure having a reinforcing member embedded in concrete or other cementitious material therein, said reinforcing member comprising a pair of heads or blocks and longitudinal spring members connecting said heads.

7. A hollow metallic trolley pole set in the ground and reinforced from the interior at the ground line by means of a reinforcing member extending above and below the ground line and embedded in concrete or other cementitious material, said reinforcing member comprising at least one head or block and a series of longitudinal spring members connected to said head.

In testimony whereof we have signed this specification in the presence of two subscribing witnesses.

HERBERT H. HILBORN.
CHARLES E. ROEHL.

Witnesses as to signature of Herbert H. Hilborn:
  JOHN J. HEFFERNAN,
  E. D. GERBER.

Witnesses as to signature of Charles E. Roehl:
  E. HENDRICKSON,
  F. A. COONEY.